(12) United States Patent
Damron et al.

(10) Patent No.: US 6,785,796 B1
(45) Date of Patent: Aug. 31, 2004

(54) METHOD AND APPARATUS FOR SOFTWARE PREFETCHING USING NON-FAULTING LOADS

(75) Inventors: Peter Damron, Fremont, CA (US); Nicolai Kosche, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 758 days.

(21) Appl. No.: 09/630,052

(22) Filed: Aug. 1, 2000

(51) Int. Cl.[7] ............................................. G06F 12/00
(52) U.S. Cl. ..................... 711/213; 711/137; 712/207
(58) Field of Search ............................... 711/137, 213, 711/169; 712/207

(56) References Cited

U.S. PATENT DOCUMENTS

| | | | |
|---|---|---|---|
| 5,778,233 A | | 7/1998 | Besaw et al. |
| 5,822,788 A | | 10/1998 | Kahn et al. |
| 5,948,095 A | * | 9/1999 | Arora et al. ................. 712/200 |
| 6,119,218 A | * | 9/2000 | Arora et al. ................. 712/207 |
| 6,253,306 B1 | * | 6/2001 | Ben-Meir et al. ........... 712/207 |

FOREIGN PATENT DOCUMENTS

EP          0 729 103 A2      8/1996

OTHER PUBLICATIONS

International Preliminary Examination Report, PCT/US01/41511, filed Aug. 1, 2001.

"Complier–Based Prefetching for Recursive Data Structure", Chi–Keung Luk and Todd C. Mowry, Dept. of Computer Science 1996 ACM pp. 222–233.

"An Effective Programmable Prefetch Engine for On–Chip Caches", Tien–Fu Chen, Dept. of Computer Science Proceedings of Micro–28 1995 IEEE pp. 237–242.

"Effective Jump–Pointer Prefetching for Linked Data Structures", Amir Roth and Gurinday S. Sohi Computer Sciences Dept. 1999 IEEE pp. 111–121.

"Dependence Based Prefetching for Linked Data Structures", Amir Roth, Andreas Moshovos and Gurindar S. Sohi Computer Sciences Dept. 1998 ACM pp. 115–126

* cited by examiner

Primary Examiner—Matthew D. Anderson
(74) Attorney, Agent, or Firm—Thelen Reid & Priest LLP; David B. Ritchie; Adrienne Yeung

(57) ABSTRACT

A method and apparatus for altering code to effectively hide main memory latency using software prefetching with non-faulting loads prefetches data from main memory into local cache memory at some point prior to the time when the data is requested by the CPU during code execution. The CPU then retrieves its requested data from local cache instead of directly seeing the memory latency. The non-faulting loads allow for safety and more flexibility in executing the prefetch operation earlier because they alleviate the concern of incurring a segmentation fault, particularly when dealing with linked data structures. Accordingly, the memory access latency that the CPU sees is essentially the cache memory access latency. Since this latency is much less than the memory latency resulting from a cache miss, the overall system performance is improved.

57 Claims, 2 Drawing Sheets

METHOD AND APPARATUS FOR SOFTWARE PREFETCHING USING NON-FAULTING LOADS

BACKGROUND OF THE INVENTION

1. Field of the Invention

The present invention relates to software control of memory access by a processing unit and, more particularly, to software controlled prefetching that effectively hides inherent memory access latency.

2. Background Art

Computer systems typically access data and/or program information from memory by utilizing the principles of temporal and spatial locality. Spatial locality, or locality in space, relates to the likelihood that, once a given entry is referenced, nearby entries will tend to be referenced in the near future. Temporal locality, or locality in time, relates to the likelihood that, once an entry is referenced, it will tend to be referenced again in the near future. To take advantage of these principles of locality, computer systems typically employ a hierarchical memory structure. This structure includes cache memory that is relatively small, fast, and local to the processor in addition to the larger, but slower, main memory. Some systems may include two or more levels of cache memory. The L2 cache, or second level of cache memory, may be located on the central processing unit (CPU) itself or on a separate integrated circuit chip, for example. The L1 cache, or first level of cache memory, is usually integrated within the CPU chip itself. Thus, in order to take advantage of the principles of locality, it is desirable to have the sought data in the cache, preferably the L1 on-chip cache, by the time the CPU makes its request for the entry.

When a memory access is requested, the system first checks the L1 on-chip cache, then the L2 cache (if present), then the main memory. While the technology used to implement the cache levels is typically static random access memory (SRAM), the technology used to implement the main memory is typically dynamic random access memory (DRAM). The DRAM cost per byte is substantially lower than the SRAM cost per byte and, as such, DRAM is the preferred choice for larger main memory systems. However, the DRAM access time is much longer than the associated cache memory access time. This results from the physical nature of the basic storage element that is a capacitor as well as the memory chip density and the overall main memory density. Given these constraints, a system that is able to manipulate the sought data access so that it is likely to be located in the local cache memory at the time that it is required by the CPU is capable of higher performance than a system that does no such explicit manipulation.

SUMMARY OF THE INVENTION

A method and apparatus for altering code to effectively hide main memory latency using software prefetching with non-faulting loads prefetches data from main memory into local cache memory at some point prior to the time when the data is requested by the CPU during code execution. The CPU then retrieves its requested data from local cache instead of directly seeing the memory latency. The non-faulting loads allow for safety and more flexibility in executing the prefetch operation earlier because they alleviate the concern of incurring a segmentation fault, particularly when dealing with linked data structures. Accordingly, the memory access latency that the CPU sees is essentially the cache memory access latency. Since this latency is much less than the memory latency resulting from a cache miss, the overall system performance is improved.

BRIEF DESCRIPTION OF THE DRAWINGS

The accompanying drawings, which are incorporated in and constitute a part of this Specification, illustrate one or more embodiments of the invention and, together with the present description, serve to explain the principles of the invention.

In the drawings.

DETAILED DESCRIPTION OF A PREFERRED EMBODIMENT

One embodiment of the present invention herein is described herein in the context of a method for modifying computer code to insert software controlled prefetches with non-faulting loads prior to the time in the sequence of the computer code at which the prefetched data is required. Those of ordinary skill in the art will realize that the following description of the present invention is illustrative only and not in any way limiting. Other embodiments of the invention will readily suggest themselves to such skilled persons having the benefit of this disclosure. Reference will now be made in detail to an implementation of the present invention as illustrated in the accompanying drawings. The same reference numbers will be used throughout the drawings and the following description to refer to the same or like parts.

In the interest of clarity, not all the routine features of the implementations described herein are described. It will of course be appreciated that in the development of any such actual implementation, numerous implementation-specific decisions must be made to achieve the developers specific goals, such as compliance with system-and business-related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

Figure 1:
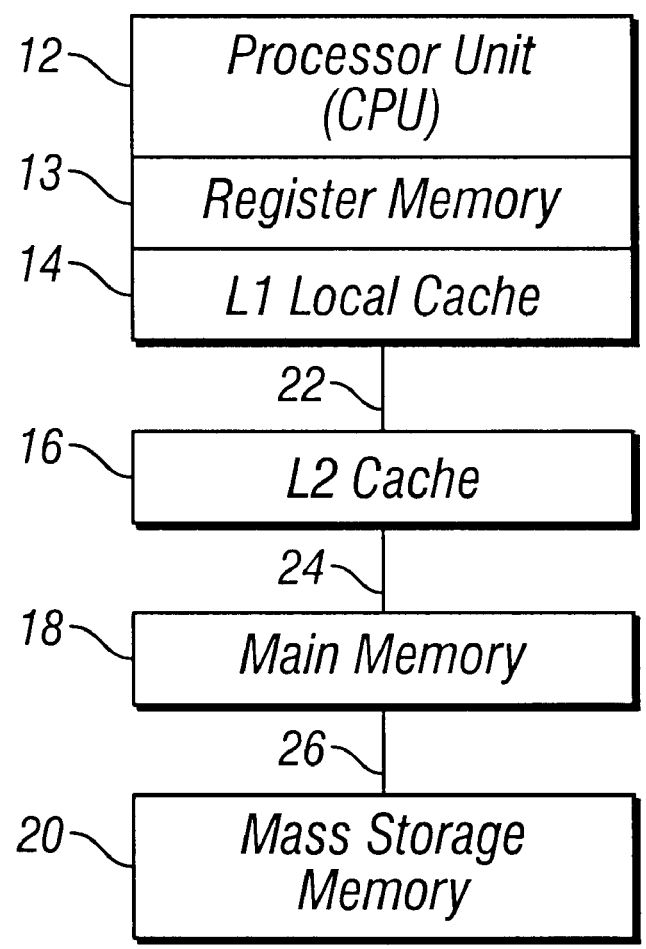
FIG. 1 is a block diagram illustrative of a typical hierarchical memory system.

FIG. 1 is a block diagram illustrative of a typical hierarchical memory system. The system 10 includes a processor unit 12 that, in accordance with a presently preferred embodiment, is a central processing unit (CPU) integrated circuit chip. Within processor 12 there is a block of registers (register memory) 13, and a block of local cache memory 14. The register memory 13 and the local cache memory 14 is implemented as high-speed SRAM-type storage in the preferred embodiment, but it could be any relatively fast memory. The processor block 12 is coupled to the second-level (L2) cache memory 16 through interconnecting structure 22 such as a data bus. The L2 cache memory 16 is implemented in SRAM technology in the preferred embodiment, but it could also be any relatively fast memory. However, if system cost is a dominating consideration, the L2 cache could be left out of the system entirely. In FIG. 1, L2 cache 16 is coupled to main memory 18 through interconnecting structure 24 such as a data bus. The main memory 18 is implemented in DRAM technology in the preferred embodiment, but it could be any relatively large memory structure. The main memory block 18 is coupled to the mass storage block 20 through interconnecting structure 26. The mass storage 20 could be a hard disk, a removable floppy disk, a magnetic tape, or any other storage medium.

The key measure of memory hierarchy performance is the average memory access time. For relative system performance analysis, it can be assumed that the different levels of cache (i.e., L1 and L2 in the preferred embodiment) are treated as one cache unit. The average memory access time equation is as follows:

average memory access time=hit time+miss rate*miss penalty

The hit time is simply the access time of the cache memory and is typically about 3 CPU clock cycles in the case of first level cache and about 15 CPU clock cycles in the case of second level cache. The miss rate is the percentage of accesses where an entry that is requested by the processor is not found in the cache unit. The miss penalty is the access time when the entry must be retrieved from main memory and this is typically about 50 or more CPU clock cycles. Of course, if the entry is not found in main memory, it must be retrieved from mass storage and the resulting access time would be substantially longer. In any event, the relative effect of the miss penalty increases as computer system CPUs get faster as compared to the main memory system. So, the miss penalty, also referred to as the memory latency, is getting longer as measured in CPU clock cycles from one design generation to the next. As is obvious from the equation and the impact of the miss penalty on the average memory access time, it is desirable to minimize the miss rate in software program implementation and to, in effect, hide the memory latency.

The effectiveness of software prefetching techniques is well known for certain types of data structures, such as array-based numeric codes. This is because the next data location is quite predictable and the data can typically be easily retrieved well ahead of the time when it is required by the CPU. However, for programs that used linked data structures, the problem of inserting software prefetches is more difficult. Suppose we have the following program structure:

```
int foo (struct bar *p, struct baz *q)
{
    if (p→right→next→val > q→left→next→data) {
        p→left→over→what += 1;
    } else {
        q→center→next→key = 42;
    }
}
```

The code for this might look something like this:

```
foo:
                save %sp, 92, %sp
    ld [p+8], r1        ! load p→right
    ld (r1+4], r2       ! load p→right→next
    ld [r2+12], r3      ! load p→right→next→val
    ld [q+4], r4        ! load q→left
    ld [r4+16], r5      ! load q→left→next
    ld [r5+20], r6      ! load q→left→next→data
    cmp r3, r6
    ble L3
    nop
```

```
L2:
    ld [p+4], r7        ! load p→left
    ld [r7+0], r8       ! load p→left→over
    ld [r8+12], r9      ! load p→left→over→what
    add r9, 1, r10      ! add 1
    st r10, [r8+12]     ! store p→left→over→what
    ba L4
    nop
```

```
L3:
    ld [q+20], r11      ! load q→center
    ld [r11+12], r12    ! load q→center→next
    mov 42, r13
    st r13, [r12+24]    ! store q→center→next→key
```

```
L4:
    ret
    restore
```

In considering this code for insertion of software prefetches in block L2, there is not much distance that would allow for data to be prefetched well in advance of when it is required by the load commands. To clarify, one could change the following code:

```
ld [p+4], r7        ! load p→left
ld [r7+0], r8       ! load p→left→over
ld [r8+12], r9      ! load p→left→over→what
```

This code could be changed to:

```
prefetch [p+4]      ! prefetch p→left
ld [p+4], r7        ! load p→left
prefetch [r7+0]     ! prefetch p→left→over
ld [r7+0], r8       ! load p→left→over
prefetch [r8+12]    ! prefetch p→left→over→what
ld [r8+12], r9      ! load p→left→over→what
```

But, the prefetches are not very far from the loads that require the data being prefetched. Only the first prefetch, prefetch [p+4], could easily be moved into a preceding block so as to schedule it with those instructions and to potentially hide the memory latency. However, it is more difficult to effectively prefetch the other two loads in block L2. These prefetch commands cannot move backwards because their address operands are obtained in the previous loads. This is the essence of a linked data structure and, in this case, the risk is that a segmentation fault (an illegal address error) would result from attempting to move any of the loads backward across a conditional branch. Thus, a new method is required to improve the applicability of software prefetches in hiding memory latencies for linked data structures.

In a specific embodiment of the present invention, a method of using non-faulting loads is set forth. The utilization of non-faulting loads allows prefetching without regard for the safety concerns of segmentation faults (or illegal addresses), as described above. (Note that although not required, in a preferred embodiment as presently implemented on a Sun Sparc computer, the non-faulting loads are imported as a load from alternative address space 0X82). The present embodiment would seek to alter code sequences like the following:

```
ld [p+4], r7        ! load p→left
ld [r7+0], r8       ! load p→left→over
ld [r8+12], r9      ! load p→left→over→what
```

This code could be changed to:

```
prefetch [p+4]      ! prefetch p→left
lda [p+4], r7       ! non-faulting load p→left
prefetch [r7+0]     ! prefetch p→left→over
lda [r7+0], r8      ! non-faulting load p→left→over
prefetch [r8+12]    ! prefetch p→left→over→what
ld [p+4], r7        ! load p→left from cache
ld [r7+0], r8       ! load p→left→over from cache
ld [r8+12], r9      ! load p→left→over→what from cache
```

The upper fragment of instructions directly above (i.e., the first five instructions) could be moved into some predecessor block in order to hide the memory latency. It should be noted that hiding the memory latency, even if only partially, also improves the overall system performance. This situation would occur if an associated load instruction accesses the cache for the requested data while that data is in the process of being loaded from main memory. The tradeoff here is more instructions and bandwidth for improved memory latency. In any event, the overall memory bandwidth or CPU operation is improved as long as, in the absence of the prefetch operation, there would have been a main memory access at that time. It should also be noted that, if the prefetch instructions were moved too far backwards and if the cache system itself is relatively small, some of the early prefetched data could be flushed out of the cache prior to the time when the CPU requests the data. As such, the code must be optimized so that the prefetch commands are inserted at reasonable intervals prior to the corresponding load commands. Arbitrarily long intervals between the prefetch commands and their associated loads are not desirable. Given these relative constraints, the lower code fragment described above (i.e., the last three instructions) could remain in its original block and benefit from accessing its data in the cache instead of from main memory. This is the benefit of software prefetching as the main memory latency is effectively hidden because the data can be accessed directly from the cache via the load commands.

In another aspect of the invention that utilizes available registers, the code can be further optimized as follows:

```
prefetch [p+4]      ! prefetch p→left
lda [p+4], r7       ! non-faulting load p→left
prefetch [r7+0]     ! prefetch p→left→over
lda [r7+0], r8      ! non-faulting load p→left→over
prefetch [r8+12]    ! prefetch p→left→over→what
ld [p+4], %g0       ! check for fault on p→left
ld [r7+0], %g0      ! check for fault on p→left→over
ld [r8+12], r9      ! load p→left→over→what from cache
```

In this code, there are two normal loads in the bottom code segment that act only as checks for non-safe loads. Note also that the bottom code segment is likely to be in a different basic block from the top segment of five instructions. In this embodiment some of the data is kept in registers r7 and r8 for a longer time. The main advantage here is that the original loads have been changed to loads that check for faults and result in removing an additional amount of memory latency.

It is not necessary to hide the full memory latency in order to take advantage of this software prefetching technique using non-faulting loads. Even partial hiding of this latency results in improved system performance. Also, the main memory bandwidth utilization as well as the L2 cache memory bandwidth utilization, if L2 cache is included in the system, can be increased, resulting in more efficient system operation.

Figure 2:
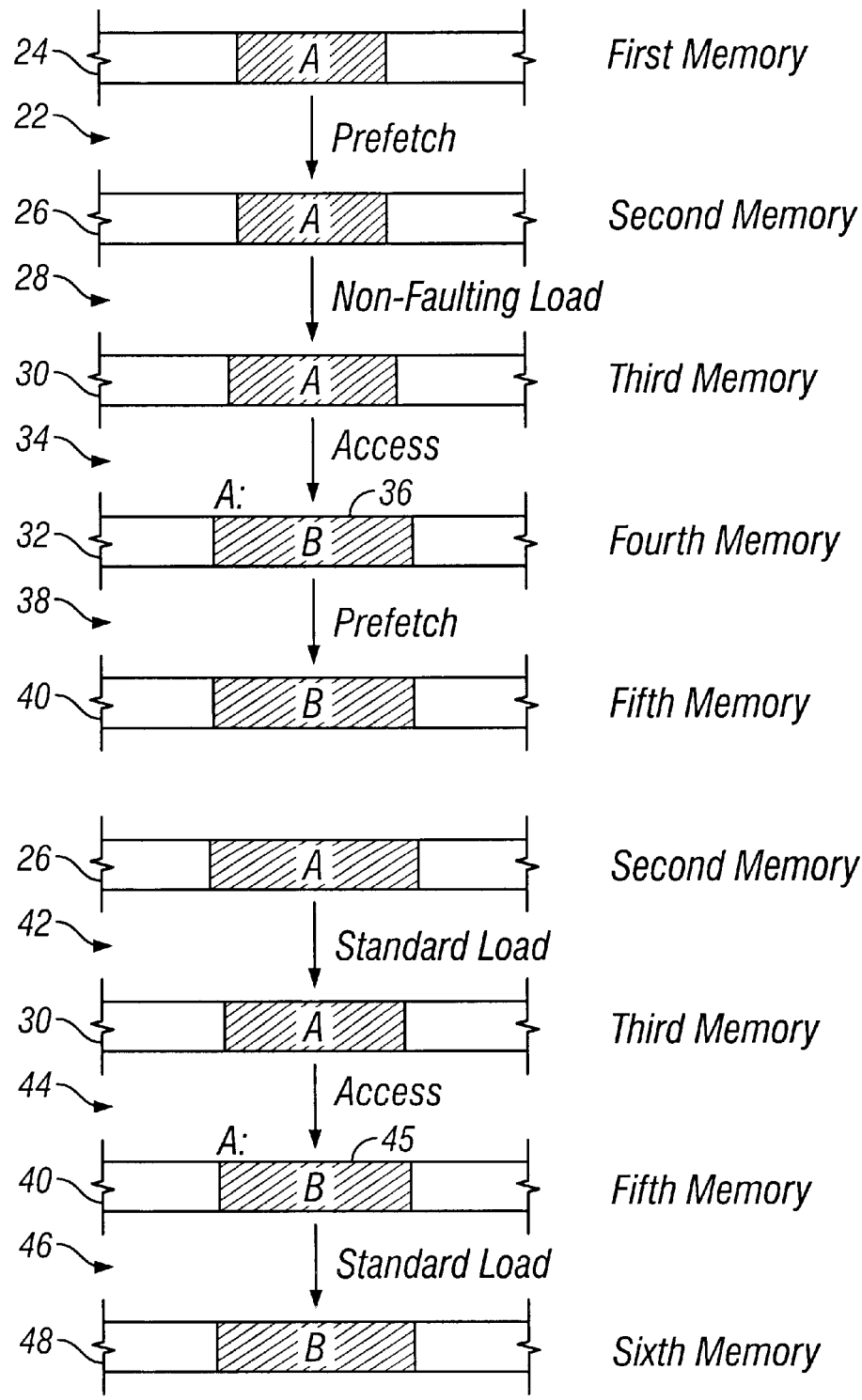
FIG. 2 is a flow diagram illustrating the operation of a specific embodiment of the present invention.

Turning now to FIG. 2, a flow diagram illustrates the operation of a specific embodiment of the present invention. In accordance with the illustrated embodiment, at least one entry is prefetched 22 from a first memory 24 into a second memory 26. A non-faulting load operation 28, as from an alternate address space, is used to load the at least one entry from second memory 26 into a third memory 30. As discussed above, the non-faulting load prevents a segmentation error and allows the system to recover by other means. The contents of third memory 30 constitutes a pointer to an address in a fourth memory 32 (as a first location 36) and is used to access 34 that fourth memory. The contents of the first location 36 is then prefetched 38 from said fourth memory 32 into a filter memory 40. The at least one entry is then loaded by standard (faulting) means 42 from second memory 26 to third memory 30. The contents "A" of third memory 30 is then used as a pointer/address to access 44 a second location 45 in fifth memory 40 and standard (faulty) means 46 are used to load the contents of second location 45 into sixth memory 48.

In a specific embodiment of the present invention, first and fourth memory is main memory such as DRAM, second and fifth memory is cache memory such as SRAM either on or off the CPU chip, and third and sixth memory is register memory such as fast SRAM within the CPU.

Note that prefetch 22, non-faulting load 28 and prefetch 38 may be speculated, that is, executed before it is known whether the result will be used, i.e., executed before it is known whether load 42 and load 46 will be executed. Also note that the standard load 42 may be just a check to determine if the address is valid. whether load 42 and load 46 will be executed. Also note that the standard load 42 may be just a check to determine if the address is valid.

The software prefetching method could also be implemented using a compiler to optimize the code based on the data structures identified or based on the code sequence identified. Also, this method could be employed as part of a combination of hardware and software prefetching control in the same system. As a hardware prefetching example, the system could recognize cues present in the program, such as the identification of linked data structures, and it could initiate prefetches based on those cues. This approach is useful with any kind of linked data structure such as a list, tree or graph since such data structures usually employ chains of dependent loads. Such structures are commonly found in compilers, databases and graphics applications.

The embodiments of the method for software prefetching using non-faulting loads described above are illustrative of the principles of the present invention and are not intended to limit the invention to the particular embodiments described. For example, those skilled in the art, in light of this disclosure, can implement, without undue experimentation, other embodiments of this method that are different from those described, but achieve the same function. Accordingly, while the preferred embodiment of the invention has been illustrated and described, it will be appreciated that various changes can be made therein without departing from the spirit and scope of the invention. As an example, the present invention is useable to prefetch data not only from memories and caches associated with a first CPU but also to prefetch data from the memories and caches of another CPU back to the first CPU. Note also that the non-faulting load means discussed herein need not be constrained either by control dependencies or alias dependencies.

While embodiments and applications of this invention have been shown and described, it would be apparent to those of ordinary skill in the art having the benefit of this disclosure that would be apparent to those of ordinary skill in the art having the benefit of this disclosure that many more modifications than mentioned above are possible without departing from the inventive concepts herein. The invention, therefore, is not to be restricted except in the spirit of the appended claims.

What is claimed is:

1. A method for hiding memory access latency, comprising:
   prefetching at least one entry from a first memory into a second memory;
   loading by non-faulting means said at least one entry from said second memory into a third memory;
   using the contents of said third memory as an address to identify a first location in a fourth memory;
   prefetching at least one entry from said first location in said fourth memory into a fifth memory;
   reloading said at least one entry from said second memory into said third memory;
   using the contents of said third memory as an address to identify a second location in said fifth memory; and
   loading by standard means at least one entry from said second location in said fifth memory into a sixth memory.

2. The method of claim 1 wherein said first memory block is main memory, said second memory block is first-level cache memory, and said third memory block is register memory.

3. The method of claim 1 wherein said first memory block is mass storage memory or removable medium memory, said second memory block is main memory, and said third memory block is register memory.

4. The method of claim 1 wherein the said first memory block is mass storage memory or removable medium memory, said second memory block is first-level cache memory, and said third memory block is register memory.

5. The method of claim 1 wherein said first memory block is main memory, said second memory block is second-level cache memory, and said third memory block is register memory.

6. The method of claim 1 wherein said first memory block is mass storage memory or removable medium memory, said second memory block is second-level cache memory, and said third memory block is register memory.

7. The method of claim 3, wherein said mass storage memory comprises computer disk memory.

8. The method of claim 2, wherein said main memory comprises dynamic random access memory (DRAM).

9. The method of claim 5 wherein said second-level cache memory comprises static random access memory (SRAM).

10. The method of claim 2, wherein said first-level cache memory comprises static random access memory (SRAM).

11. The method of claim 2, wherein said register memory comprises static random access memory (SRAM).

12. The method of claim 9 wherein said second-level cache is located on a separate chip from the central processing unit (CPU).

13. The method of claim 9 wherein said second-level cache is located on a same chip as a central processing unit (CPU).

14. The method of claim 10 wherein said first-level cache memory is located on a same chip as a central processing unit (CPU).

15. The method of claim 11 wherein said register memory is located on a same chip as a central processing unit (CPU).

16. The method of claim 1 wherein said first memory and said second memory occupy the same physical memory.

17. The method of claim 1 wherein said reloading is performed as a check for load faults.

18. The method of claim 1 wherein said prefetching steps and said loading by non-faulting means step are performed in advance of said reloading and said loading by standard means steps.

19. The method of claim 1 wherein both said prefetching steps and said loading by non-faulting means step are performed before it is known whether said reloading and said loading by standard means steps will be performed.

20. A program storage device readable by a machine, embodying a program of instructions executable by the machine to perform a method for hiding memory access latency, said method comprising:
   prefetching at least one entry from a first memory into a second memory;
   loading by non-faulting means said at least one entry from said second memory into a third memory;
   using the contents of said third memory as an address to identify a first location in a fourth memory;
   prefetching at least one entry from said first location in said fourth memory into a fifth memory;
   reloading said at least one entry from said second memory into said third memory;
   using the contents of said third memory as an address to identify a second location in said fifth memory; and
   loading by standard means at least one entry from said second location in said fifth memory into a sixth memory.

21. The device of claim 20 wherein said first memory block is main memory, said second memory block is first-level cache memory, and said third memory block is register memory.

22. The device of claim 20 wherein said first memory block is mass storage memory or removable medium memory, said second memory block is main memory, and said third memory block is register memory.

23. The device of claim 20 wherein said first memory block is mass storage memory or removable medium memory, said second memory block is first-level cache memory, and said third memory block is register memory.

24. The device of claim 20 wherein said first memory block is main memory, said second memory block is second-level cache memory, and said third memory block is register memory.

25. The device of claim 20 wherein said first memory block is mass storage memory or removable medium memory, said second memory block is second-level cache memory, and said third memory block is register memory.

26. The device of claim 22 wherein said mass storage memory comprises computer disk memory.

27. The device of claim 21 wherein said main memory comprises dynamic random access memory (DRAM).

28. The device of claim 24 wherein said second-level cache memory comprises static random access memory (SRAM).

29. The device of claim 21 wherein said first-level cache memory comprises static random access memory (SRAM).

30. The device of claim 21 wherein said register memory comprises static random access memory (SRAM).

31. The device of claim 28 wherein said second-level cache is located on a separate chip from a central processing unit (CPU).

32. The device of claim 28 wherein said second-level cache is located on a same chip as a central processing unit (CPU).

33. The device of claim 29 wherein said first-level cache memory is located on a same chip as a central processing unit (CPU).

34. The device of claim 30 wherein said register memory is located on a same chip as a central processing unit (CPU).

35. The device of claim 20 wherein said first memory and said second memory occupy the same physical memory.

36. The device of claim 20 wherein said reloading is performed as a check for load faults.

37. The device of claim 20 wherein prefetching steps and said loading by non-faulting means step are performed in advance of said reloading and said loading by standard means steps.

38. The device of claim 20 wherein both said prefetching steps and said loading by non-faulting means step are performed before it is known whether said reloading and said loading by standard means steps will be performed.

39. An apparatus having the capability of hiding memory access latency, comprising:

means for prefetching at least one entry from a first memory into a second memory;

means for loading by non-faulting means said at least one entry from said second memory into a third memory;

means for using the contents of said third memory as an address to identify a first location in a fourth memory;

means for prefetching at least one entry from said first location in said fourth memory into a fifth memory;

means for reloading said at least one entry from said second memory into said third memory;

means for using the contents of said third memory as an address to identify a second location in said fifth memory; and means for loading by standard means at least one entry from said second location in said fifth memory into a sixth memory.

40. The apparatus of claim 39 wherein said first memory block is main memory, said second memory block is first-level cache memory, and said third memory block is register memory.

41. The apparatus of claim 39 wherein said first memory block is mass storage memory or removable medium memory, said second memory block is main memory, and said third memory block is register memory.

42. The apparatus of claim 39 wherein the said first memory block is mass storage memory or removable medium memory, said second memory block is first-level cache memory, and said third memory block is register memory.

43. The apparatus of claim 39 wherein said first memory block is main memory, said second memory block is second-level cache memory, and said third memory block is register memory.

44. The apparatus of claim 39 wherein said first memory block is mass storage memory or removable medium memory, said second memory block is second-level cache memory, and said third memory block is register memory.

45. The apparatus of claim 41, wherein said mass storage memory comprises computer disk memory.

46. The apparatus of claim 40, wherein said main memory comprises dynamic random access memory (DRAM).

47. The apparatus of claim 43 wherein said second-level cache memory comprises static random access memory (SRAM).

48. The apparatus of claim 40, wherein said first-level cache memory comprises static random access memory (SRAM).

49. The apparatus of claim 40, wherein said register memory comprises static random access memory (SRAM).

50. The apparatus of claim 47 wherein said second-level cache is located on a separate chip from the central processing unit (CPU).

51. The apparatus of claim 47 wherein said second-level cache is located on a same chip as a central processing unit (CPU).

52. The apparatus of claim 48 wherein said first-level cache memory is located on a same chip as a central processing unit (CPU).

53. The apparatus of claim 49 wherein said register memory is located on a same chip as a central processing unit (CPU).

54. The apparatus of claim 39 wherein said first memory and said second memory occupy the same physical memory.

55. The apparatus of claim 39 wherein said means for reloading performs a check for load faults.

56. The apparatus of claim 39 wherein both said means for prefetching and said means for loading by non-faulting means operate in advance of said means for reloading and said means for loading by standard means.

57. The apparatus of claim 49 wherein both said means for prefetching and said means for loading by non-faulting means operate before it is known whether said means for operating and said means for loading by standard means need to operate.

* * * * *